United States Patent
Graves et al.

(10) Patent No.: US 7,606,876 B2
(45) Date of Patent: Oct. 20, 2009

(54) MEDIA KEYING FOR UPDATEABLE CONTENT DISTRIBUTION

(75) Inventors: Roger Graves, Santa Rosa, CA (US); Preston Kincaid, Hollister, CA (US)

(73) Assignee: Kincaid Technology Corporation, Santa Rosa, CA (US)

( * ) Notice: Subject to any disclaimer, the term of this patent is extended or adjusted under 35 U.S.C. 154(b) by 484 days.

(21) Appl. No.: 10/470,638

(22) Filed: Aug. 9, 2004

(65) Prior Publication Data

US 2005/0204017 A1 Sep. 15, 2005

Related U.S. Application Data

(60) Provisional application No. 60/493,608, filed on Aug. 8, 2003.

(51) Int. Cl.
*G06F 15/177* (2006.01)
*G06F 15/16* (2006.01)
*G06F 17/30* (2006.01)

(52) U.S. Cl. ............... 709/219; 709/228; 709/227; 709/206; 707/10

(58) Field of Classification Search .......... 709/227, 709/206, 219, 228; 707/10
See application file for complete search history.

(56) References Cited

U.S. PATENT DOCUMENTS

| | | | |
|---|---|---|---|
| 6,073,075 A | 6/2000 | Kondou et al. | |
| 6,182,050 B1 | 1/2001 | Ballard | |
| 6,209,026 B1 | 3/2001 | Ran et al. | |
| 6,460,036 B1 * | 10/2002 | Herz | 707/10 |
| 6,728,759 B1 * | 4/2004 | Na | 709/206 |
| 7,366,779 B1 * | 4/2008 | Crawford | 709/227 |
| 2004/0111518 A1 * | 6/2004 | Schuyler | 709/228 |

* cited by examiner

*Primary Examiner*—Tonia L Dollinger
*Assistant Examiner*—Anish Sikri
(74) *Attorney, Agent, or Firm*—Craig M. Stainbrook; Stainbrook & Stainbrook, LLP

(57) ABSTRACT

A method and system for keying media allows for the distribution of updateable content to an end user. The media are any type of processor readable, portable apparatus containing a preinstalled Keying Application and unique Source ID. A particular medium is provided to an end user and the end user runs the Keying Application on a network-connected electronic device, such as a computer or PDA. The Keying Application interacts with a Content Server via the network connection. The end user also interacts with the Content Server via the Keying Application. Through these interactions, the Content Server distributes specific updateable content to the Keying Application, which displays the specific content to the end user. The content may comprise catalog and directory information.

24 Claims, 4 Drawing Sheets

MEDIA KEYING FOR UPDATEABLE CONTENT DISTRIBUTION

This application claims the benefit of priority to and incorporates by reference U.S. Provisional Application Ser. No. 60/493,608 filed Aug. 8, 2003.

BACKGROUND OF THE INVENTION

1. Field of the Invention

The present invention relates to information distribution. More particularly, the invention relates to the usage of media with content for the distribution of remotely updateable information.

2. Description of the Prior Art

The distribution of multimedia content and other data has traditionally been achieved by using media, such as the floppy disk, magnetic tape or compact disc (CD), containing information supplied by the content provider. Typically, the media are pre-recorded with information from the content provider and, after being sent to the end user, the end user views the information by reading the media. The information is meant to be static for the end user, that is, after the information is pre-recorded onto the media, the information is not changed or updated by the content provider. Such change or update would be impractical, as it would require the end user to return the media to the content provider for updating.

For instance, a mail-order retail content provider might pre-record a sales catalog onto a CD and send the CD to a consumer. The consumer would then access the CD and shop for items in the retailer's catalog. If the retailer were to update the catalog in any way (e.g., error connection, price update, cancelled inventory, etc.) the consumer's CD would be out of date. For write-once media used for content distribution, such as standard CD and DVD, distributed information cannot be updated. The retailer would have to send the consumer a new CD with the new catalog information.

In the case of re-writable media (e.g., floppy disks, CD-RW, key-chain RAM, etc.), the update process is possible. The end user would return the re-writable media to the content provider and the content provider would over-write the old information with new information. However, due to economic constraints, information-containing media are typically distributed in large quantities. It would be impractical, if not impossible, for content providers to update their distributed re-writable media in this manner.

With the advent of the Internet and computer networking, data can be "downloaded"; that is, transferred from one computer to another computer over the network. The Internet and related browser applications simplified this process by allowing content to be served anywhere, anytime, by using HTTP (Hyper-Text Transport Protocol). In the early development and use of HTTP, most of the content on the Internet was "static" in that it was not based on a constantly updated information source, such as connected to live database. With the increased use of scripting and web-based database access/query technologies such CFML (Cold Fusion Markup Language), ASP (Active Server Pages), Perl (Practical Extraction and Report Language) PHP (PHP: Hypertext Preprocessor), and Java Servlets, the content served from one computer to another over the network can be "live" or "dynamic" in the sense that it can be updated in real-time via a database or other application program on the server. In this way, the end user potentially gets a new or different experience each time they are served content from a particular computer. For instance, a website with the weather forecast might change from hour-to-hour or minute-to-minute. Such information would not be useful if pre-recorded on a fixed media.

Therefore, what is needed is a method and system for continually distributing updateable content to an end user using media that contains static information, without requiring the content provider to re-write the media or to provide updated media to the end user.

SUMMARY OF THE INVENTION

A method and system for keying media allows for the distribution of updateable content to an end user. The media are any type of processor readable, portable apparatus that includes a preinstalled Keying Application and unique Source ID. A particular medium is provided to an end user and the end user runs the Keying Application on a network-connected display device, such as a computer or PDA. The Keying Application interacts with a Content Server via the network connection. The end user also interacts with the Content Server via the Keying Application. Through these interactions, the Content Server distributes specific updateable content to the Keying Application, which displays the specific content to the end user.

BRIEF DESCRIPTION OF THE DRAWINGS

These and other aspects of an embodiment of the present invention are better understood by reading the following detailed description of the preferred embodiment, taken in conjunction with the accompanying drawings, in which.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
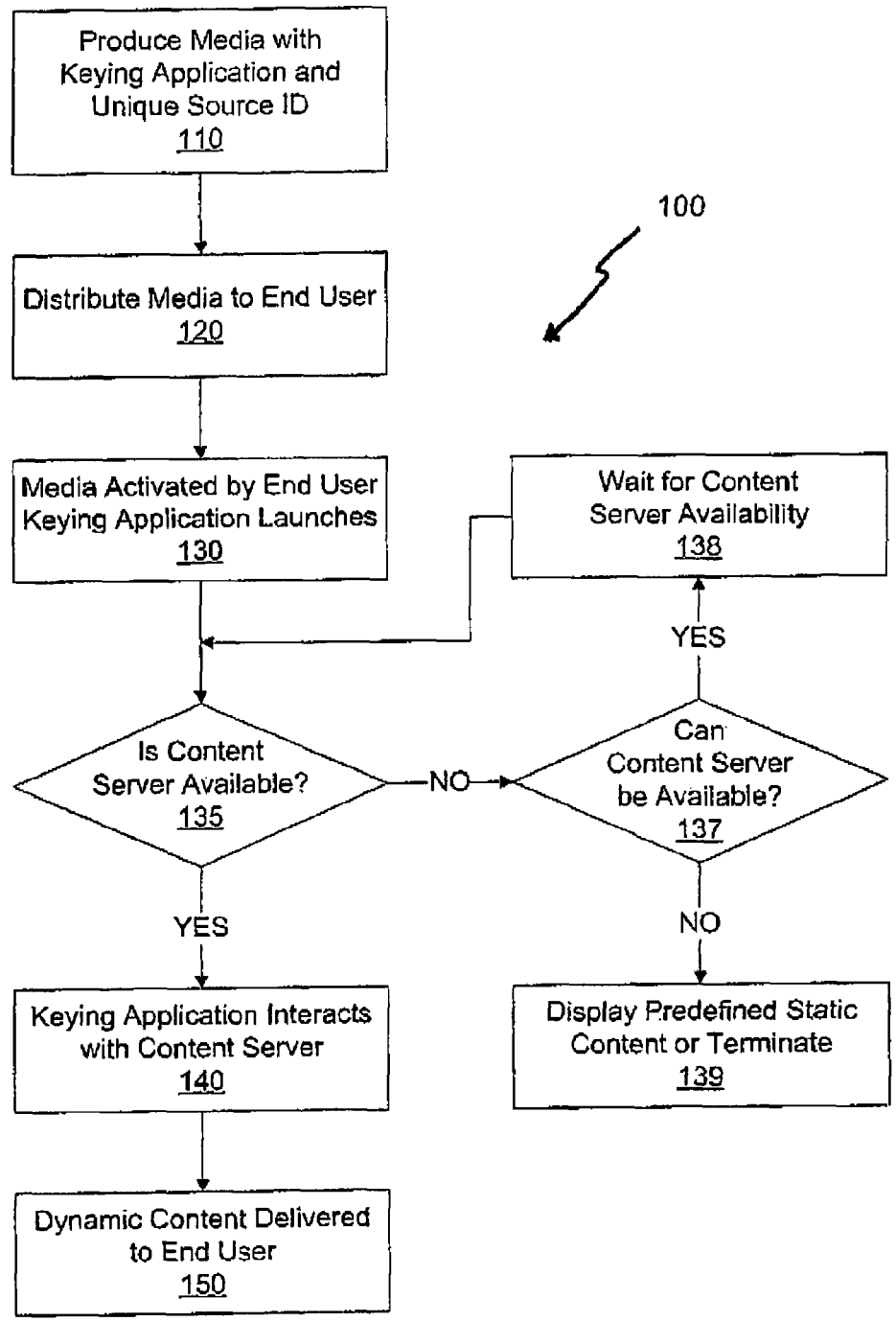
FIG. 1 illustrates the Media Keying content distribution process according to an embodiment of the present invention.

FIG. 1 illustrates the process 100 of using media keying to distribute updateable content according to an embodiment of the invention. As shown in FIG. 1, a content provider stores on, or uploads onto, a particular media a Keying Application and an associated Keying Application Source ID (block 110). One of ordinary skill in the art will easily understand that any type of media, volatile or non-volatile, can be used (e.g., floppy disk, magnetic tape, EEPROMS, CD, DVD, memory card, etc.), all of which are within the scope of the present invention. The Source ID may identify the distribution point of the media, or the identity/profile of an end user who will be given the media. For instance, with a department store content provider, one media that is distributed to customers of that store might contain a Source ID that identifies the customer as having shopped in the sporting goods section of the store. With this information encoded onto the media, the media becomes personalized from the standpoint that a specific demographic or profile is established in relation to those particular customers.

The media containing the Keying Application and Source ID may be produced locally, at the distribution site, or pre-produced in mass quantities. Further, the media may each be given a unique serial number. The store or merchant or content provider may then associate a particular serial number or group of serial numbers as related to a particular department within the store or to the store itself, or type of content, as desired. The Keying Application is discussed in greater detail below.

Once produced, the media can be distributed to end users (block 120). The media can be distributed via any means, such as regular mail, at a business site, in a mall kiosk, or, in the case of a mini wallet-sized CD, even handed out as a business card. When the end user has possession of the media, the media can be accessed using a media accessing/reading device, such as on a personal computer system, that is capable of accessing a network. The network device can access the media via any means available to it, such as a serial or parallel connection, a USB connection, a floppy disk drive, a CD drive, a DVD drive, and the like. The present invention is intended to encompass any device capable of accessing/reading the media and connected to the network (e.g., laptop computer, Personal Digital Assistant, cell phone, etc.). Upon accessing/reading the media, the Keying Application is launched by any suitable process, for example, either automatically or by user intervention, or a combination of user intervention and automation (block 130).

Launching the Keying Application starts a self-contained, user interface. This user interface is specific to the device upon which the media is accessed/read. For example, in the case of running the media on a personal computer system, the user interface may be a network browser or browser-like application, which eliminates the need for use of any other external programs (i.e., external to the Keying Application) to access the content. As additional examples, the Keying Application might be a text-based, prompt-and-respond user interface, or a GUI with user initiated hyperlinks. The Keying Application then checks to see whether the Content Server is available (block 135). The Content Server is a source of updateable information ultimately displayed to the user and may be one system or many systems distributed around a network. The process of checking the Content Server is illustrated throughout this disclosure as checking for the availability of an Internet connection; but it can also take other forms, such as checking an Internet connection, checking the operability of the Content Server itself or checking the connectivity/compatibility of the Content Server to the user's device.

If the Content Server is not available, the Keying Application will determine whether the Content Server can possibly become available (block 137). For example, the Keying Application might check to see if the user's system allows it to automatically establish the necessary network connection, and if so, attempt to make that connection. Further, the Keying Application might sequentially check the user's system for various possible network connections (e.g., wired, wireless local area networks, wireless wide area networks, etc.) and select the most desirable connection based on predetermined criteria (e.g., maximum available bit rate, number of available connections, distance to nearest wireless access point, etc.). If the Content Server can possibly become available within a specific amount of time (i.e., the Keying Application times out after attempting to automatically connect via the user's system) or through specific actions (e.g., automatically connecting on its own, prompting the user to connect, etc.), the Keying Application waits for the Content Server to become available (block 138). If the Content Server cannot become available within a specified amount of time or through specific actions, the Keying Application can take one of two courses of action. First, the Keying Application can simply terminate execution (block 139). This will end the user's ability to view any of the distributed, updateable information. Second, the Keying Application can launch, as is typically the case today, predefined static content stored on the same medium as the Keying Application (block 139). The predefined static content is loaded onto the medium at production and does not require the Content Server connectivity for delivery. However, this predefined static content will not be updateable until after the Keying Application establishes Content Server connectivity.

Once the Content Server is available, the Keying Application interacts with the Content Server (block 140). This interaction can take the form of the Content Server delivering custom content to the user based upon the Source ID or presenting the user with interactive content requiring responses back and forth between the Content Server and the user. The interaction can also include functions such as browsing, multi-media playing, forms processing, or any functionality that is possible via network communication. Thus, at block 150, dynamic content which is customizable based at least in part upon the Source ID, can be delivered to the end user from the content server. This interaction is discussed in further detail below with reference to FIG. 3. Content may include, for example, directories and catalogs of goods and services.

Figure 2:
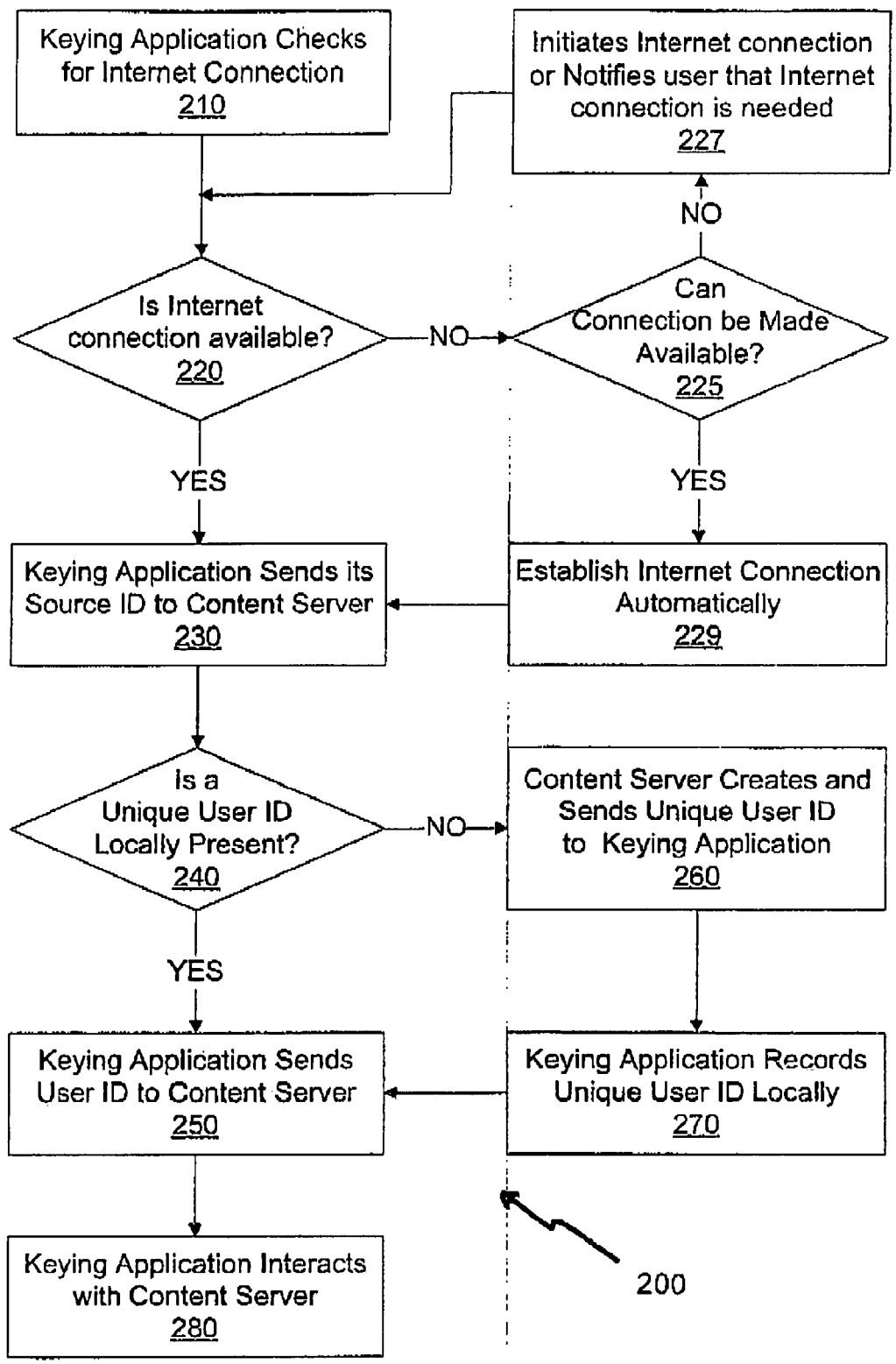
FIG. 2 illustrates the initial interaction between the Keying Application and the Content Server according to an embodiment of the present invention.

FIG. 2 illustrates the initialization of interaction between the Keying Application and the Content Server according to an embodiment of the present invention. As shown in FIG. 2, the Keying Application, when launched, first checks for the presence of an Internet connection (block 210). As previously discussed, this check might include other or additional Content Server connectivity checks. If the Internet connection is not available, the Keying Application checks whether the system or device upon which it is running allows for automatically establishing an Internet connection; that is, whether an Internet connection can be made available (block 225). If the Keying Application can automatically establish an Internet connection, it does so (block 229) and continues operation. If an Internet connection is not available and cannot automatically be established, the Keying Application will attempt to establish a connection using the host machine's settings, or notify the user that a connection is needed for distribution of the updateable content (block 227).

If an Internet connection is, or can be made, available, the Keying Application sends its Source ID to the Content Server (block 230). This allows a single Content Server to serve many different Keying Applications, with the Source ID being used as a differentiator, along with the unique User ID (discussed below), to separate what updateable content is distributed to which end user. This also allows this embodiment to distribute different content based on Source ID to a single user (based on unique User ID), as well as one content to multiple end users, while eliminated duplicative content distribution to users. For example, a single user may receive two different media, each with a different Source ID, yet serviced by the same Content Server. When accessed, each of the two media will launch its Keying Application and connect to the same Content Server. However, each Keying Application will initiate distribution of a different type or category of content from the Content Server because of the different Source IDs.

The Keying Application next checks to see whether a unique User ID is locally present (block 240) on the system and/or media currently being used for access. A unique User ID would be locally present if the user had previously established one through access of similar media to that currently being run. A unique User ID would not be locally present if this media access were the first for this user on this system, or if one previously established had been deleted from the system. If a User ID it is not locally present, the Content Server can create one and send it to the Keying Application (block 260). If the media containing the Keying Application is non-recordable, the Keying Application would record the received User ID on the local system or device running the Keying Application (block 270). Alternatively, or additionally, the Keying Application might record the received unique User ID on the media itself. The saved User ID might be in the form of a cookie or shared object, for example, and be saved on the media itself, in system memory (e.g., hard drive), or other non-volatile memory device or location.

Once the unique User ID is present to the local system, the Keying Application retrieves the User ID locally and sends it to the Content Server (block 250). Using this unique User ID, along with the previously transmitted Source ID, the Keying Application then interacts with the Content Server to deliver custom content to the user (block 280). In addition to the delivery of dynamic content, the Content Server uses the User ID identifier embedded in all communication with the Keying Application to record user data such as content seen or items purchased, user interface behaviors such as mouse and keyboard activity, and how long the user spends interacting with or reading specific content. These additional uses for the User ID are subject to appropriate privacy considerations.

Figure 3:
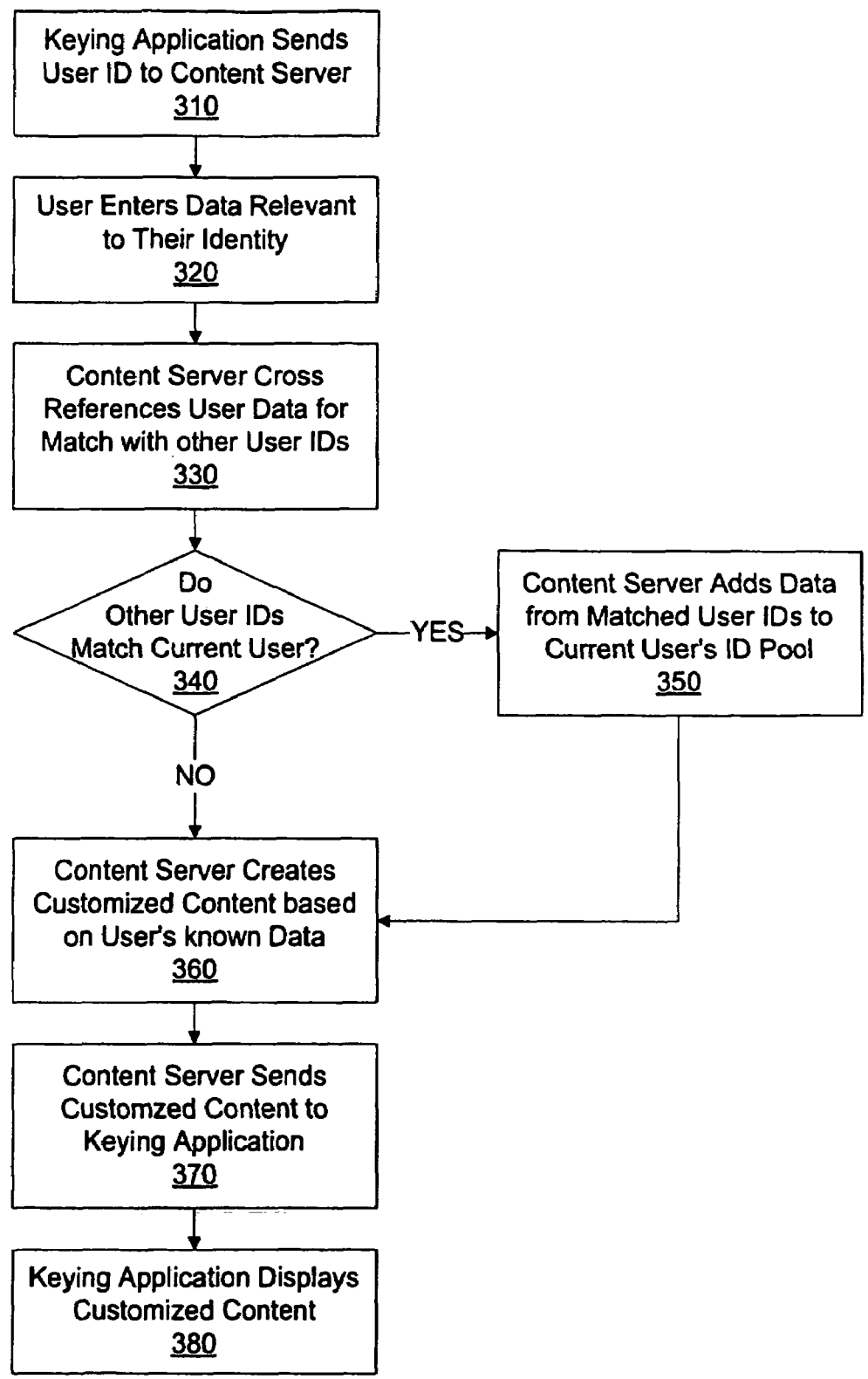
FIG. 3 illustrates how the system delivers correct customized content through the Keying Application according to an embodiment of the present invention.

FIG. 3 illustrates the interaction between the Content Server and the user according to an embodiment of the present invention. As shown in FIG. 3, the Content Server constantly attempts to link multiple User ID identifiers together in order to maintain data integrity and deliver the desired customized content to the user. This is done by comparing data between multiple User ID identifier sets. The same Keying Application, different Keying Applications with separate Source IDs, browsers, browser-like applications, or any other means of data collection may have collected the data considered for the current User ID.

A User, by using the Keying Application running on the local system or device, interacts with the Content Server (block 310). During interaction with the user, data is collected from the user (block 320) that the Content Server uses to determine the User ID uniqueness of the current user. Data fields determined to be unique to a user, or linking data, could be any collected data, such as a social security number, email address, names, passwords, etc. (block 330). The linking data could be one piece of data (e.g., social security number) or a combination of data (e.g., first name combined with last name and a mailing address) that would be unique to the user. When multiple User IDs are determined to be from the same user (block 340), the data from the other User IDs (i.e., those not in use during the current interaction between the Keying Application and the Content Server) are combined with the current User ID (block 350). The combined data from the multiple User IDs are referenced in the creation of customized content by the Content Server (block 360). The customized content derived from the combined data of the multiple User ID data sets are then delivered to the Keying Application (block 370), which displays the content to the user (block 380).

Figure 4:
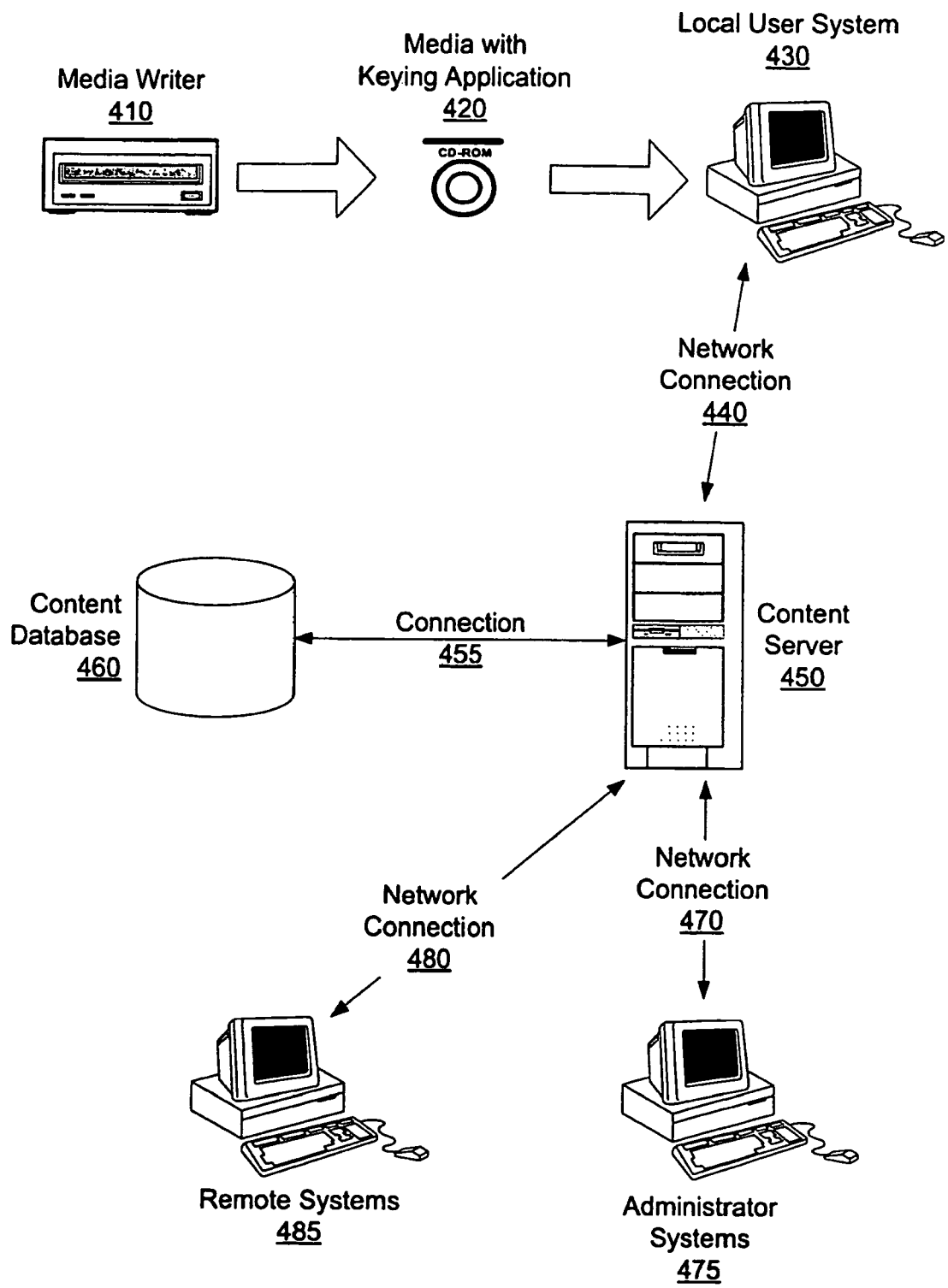
FIG. 4 illustrates a system architecture according to an embodiment of the present invention.

FIG. 4 illustrates a system view of an embodiment of the present invention. A media writer 410 can be used at a production facility or at the distribution site itself to write/record both the Keying Application and the unique Source ID onto the media of choice. This creates a medium 420 with a Keying Application that can be provided to an end user. The medium 420 may be, for example, a mini-CD/DVD or full-size CD/DVD, depending upon the implementation and use. However, one of ordinary skill in the art will recognize that the media 420 could be any of a wide variety of storage devices. The media 420 is distributed to the end user (not shown) by direct (e.g., from the vendor, marketer, or retailer) or indirect (e.g., mail or kiosk) means. The end user would then access/read the media 420 using any kind of local device or system 430. The only constraints on the local user system 430 are that it be capable of reading/accessing the media, running/displaying the Key Application and maintaining a network connection. Such local user systems are well-known in the art and will not be further described herein.

The local user 430 would then launch the Keying Application found on media 420. Assuming that a Network connection 440 is available, the Local User System 430 will interact with Content Server 450 via the Keying Application. Network connection 440 (as well as Network connections 470 Network connections 480) may be Internet connections or Intranet connections within an organization, or any other communication channel such as a cellular or other wireless connection.

Content Server 450 is a computer system or other information processing device that is available to the user through Network connection 440. Content Server 450 may contain one or more applications designed to access a Content Database 460, to which it is connected, access zero to many Administrator Systems 475 through Network connection 470, and zero to many Remote Systems 485 through Network connections 480. The Network connections 440, 470, 480 can be same or different types of connections. The Content Server 450 can compose and serve customer content to the Local User System 430 determined by data and parameters stored in Content Database 460, or the zero to many Remote Systems 485, or a combination of them. For instance, a Content Server 450 can be a computer administered by Linux running an Apache web server in conjunction with Perl, PHP, and C++ applications.

The Content Database 460 can be any program, parts of a program, or system that stores and qeuries data accessible by applications running on Content Server 450. For instance, Oracle, MySQL, SQL Server, an DB2 are common 3rd party content databases that could be used. Another instance of Content Database 460 could be an applications written in VBScript that queries and stores data using text and binary files on a hard drive. Another instance of Content Database 460 could be parts of an application (e.g., objects, functions, pieces of embedded code, etc.) residing on Content Server 450 that manage the querying and storing of data. The Content Database 460 may reside on the same system as the Content Server 450 or reside separately and communicate to the Content Server 450 through the Network connection 455, or other suitable connection.

Administrator Systems 470 can be any number of administrative systems that pass parameters to Content Server 450, which in turn stores the parameters locally or in Content Database 460. These parameters determine which content is presented to local user system 430, how content is assembled, and how the Keying Application displays the content (i.e., the look & feel). For instance, an Administrator System 475 could be a store owner in a remote location who uses a browser connected to the Internet (i.e., Network connection 470) to modify how inventory items are displayed to Local User System 430. An application residing on Content Server 450 receives the parameters and stores them in Content Database 460.

Remote Systems 485 can be any number of data sources that send and/or receive data to/from Content Server 450 for storage in Content Database 460. For instance, a store's inventory data residing on a remote system is periodically synchronized with the information stored in Content Database 460, which are then queried by Content Server 450 and sent to the Local User System 430 for display. Remote System 485 can also be any number of data sources that send and/or receive data to/from Content Server 450 for direct real time access by Local User System 430. For instance, Content Server 450 using XML or another communication protocol could query a National Weather Service Remote System 485 for the most current weather conditions pertinent to Local User System 430. After receiving the weather data transmission from the National Weather Service Remote System 485, Content Server 450 formats the data to be useable by the Keying Application, which receives and displays the data on Local User System 430.

Although the present invention has been particularly described with reference to embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagram. It is intended that the appended claims include such changes and modifications.

What is claimed is:

1. A system for distributing and remotely updating information contained on processor readable portable external storage media, wherein the information includes a storage media identifier and a user accesses the information by connecting the storage media to an electronic device adapted to connect to a network, the system comprising:
   at least one content server connected to the network and adapted for automatically creating and updating the information according to a profile associated with the user and for delivering updated information to the electronic device determined by the storage media identifier, wherein the profile is generated from factors including the storage media identifier, a user identity (user ID), a history of transactions involving the user ID, and a history of transactions involving the electronic device; and
   a keying application stored on the external storage media for launching and running on the electronic device for selecting the user ID and transmitting the user ID and the storage media identifier to said content server;
   wherein said keying application selects the user ID based on the storage media identifier and other indicia of user identification, and wherein if said external storage media containing said keying application is non-recordable, said keying application records the user ID generated by said content server on the local electronic device running said keying application.

2. A system according to claim 1, wherein the factors further include recorded personal and demographic information of the user, wherein the content server and electronic device collect and record the personal and demographic information of the user.

3. A system according to claim 1, wherein the factors further include original source and content of the media, wherein the original source of the media includes vendors, marketers and retailers and wherein the original content of the media may vary according to time and location of original distribution.

4. A system according to claim 1, wherein the factors further include linking data wherein the linking data is obtained by combining a plurality of user records, wherein each of the plurality of user records shares at least one element of common personal information with any other of the plurality of user records.

5. A system according to claim 1, wherein the history of transactions is recorded by the keying application and the content server, and the history of transactions comprises: prior purchases executed using the user ID; prior access of certain portions of the information; absence of prior accesses of certain other portions of the information; and prior searches and requests for different information wherein the searches and requests were initiated by the user.

6. A system according to claim 1, wherein the keying application is stored on the media and automatically starts when the media is connected to the electronic device.

7. A system according to claim 1, wherein the information further includes information organized according to relationships between elements of the information and the system further comprises a browsing application for presenting the elements in the form of a product catalog.

8. A system according to claim 1, wherein the information further includes information organized according to relationships between elements of the information and the system further comprises a browsing application for presenting the elements in the form of a directory.

9. A method for distributing and remotely updating information contained on storage media, wherein the information includes a media identifier and a user accesses the information by connecting the media to an electronic device, which may be adapted to connect to or selectively connected to a network, the method comprising the steps of: creating original information on a content server and storing the original information on the media, wherein the original information is customized according to time and location of distribution;
   identifying a user of the media by associating the media identifier with a user ID, wherein the user ID is linked to personal identifying information of the user and the media identifier is associated with the user ID using a keying application; transmitting the user ID and media identifier to the content server to access a profile of the user, wherein the profile is based on factors including: a past history of transactions, demographic information received from the user, and the location of original distribution of the media; and creating updated information and transmitting the updated information to the electronic device.

10. A method according to claim 9, wherein the information further includes information organized according to relationships between elements of the information and the system further comprises a browsing application for presenting the elements in the form of a product catalog.

11. A method according to claim 9, wherein the information further includes information organized according to relationships between elements of the information and the system further comprises a browsing application for presenting the elements in the form of a directory.

12. A method of keying and updating information stored on external storage media, comprising the steps of:
   (a) providing one or more network connected content servers having information content;
   (b) providing a suitable type of external storage media;
   (c) storing onto the storage media predefined static content, updateable content, a keying application, and an associated keying application source ID for identifying either or both the distribution point of the media and/or the identity/profile of an end user who will be given the storage media;
   (d) distributing the storage media to one or more end users;
   (e) accessing the storage media distributed to the end user using a network connected media accessing/reading device;
   (f) launching the keying application stored on the external storage media;
   (g) establishing a network connection using the keying application;
   (h) retrieving the user ID locally from the network connected media accessing/reading device and sending it to the content server; and
   (I) delivering custom content to the end user from the content server to the keying application for display on the network connected media accessing/reading device; and
   (i)(1) if the storage media containing the keying application is non-recordable, using the keying application to record the user ID on the network connected media accessing/reading device running the keying application.

13. The method of claim 12, wherein the external storage media is selected from the group consisting of floppy disk, magnetic tape, EEPROMS, CD, DVD, PC card, memory card, memory stick, flash memory card.

14. The method of claim 12, wherein the accessing step is performed by a device selected from the group consisting of USB connection, a floppy disk drive, a CD drive, a DVD drive, memory stick reader, and memory card reader, which may be associated with a consumer electronic device, such as personal computer, laptop computer, Personal Digital Assistant, and cell phone.

15. The method of claim 12, wherein the launching step involves using a suitable process either automatically or by user intervention, or a combination of user intervention and automation, wherein launching the keying application starts a self-contained, user interface specific to the device upon which the media is accessed/read.

16. The method of claim 12, wherein the launching step is performed by either a network browser, a browser-like application, a text-based, prompt-and-respond user interface, or a GUI with user initiated hyperlinks.

17. The method of claim 12, wherein step (g) further includes the steps of:
   (g)(1) if the network connection is not available, checking whether the system or device upon which it is running allows for automatically establishing a network connection, and automatically making a network connection if the keying application can automatically establish a network connection, and
   (g)(2) if a network connection is not available and cannot automatically be established, attempting to establish a connection using host machines settings or notifying the user that a connection is needed for distribution of the updateable content
   (g)(3) if a network connection is, or can be made, available, sending send the keying application source ID and or user ID to the content server.

18. The method of claim 12, wherein step (h) further includes:
   (h)(1) checking with the keying application to see whether a unique user ID is locally present on the system and/or media currently being used for access;
   (h)(2) if a User ID it is not locally present, using the content server to create one and send it to the keying application;
   (h)(3) if the media containing the keying application is non-recordable, recording the received user ID on the local system or device running the keying application;
   (h)(4) if the media containing the keying application is recordable, recording the received unique user ID on the media itself.

19. The method of claim 12, wherein step (h) further includes:
   (h)(1) checking the operability of the content server;
   (h)(2) checking the connectivity/compatibility of the content server to the user's device;
   (h)(3) if the content server is not available, determining whether the content server can possibly become available;
   (h)(4) if the content server can become available within a specific amount of time, waiting for the content server to become available, and if the content server cannot become available within a specified amount of time or through specific actions, terminating execution or launching predefined static content stored on the same medium as the keying application.

20. The method of claim 12, wherein step (I) further includes providing the end user with interactive content requiring responses back and forth between the content server and the user.

21. The method of claim 12, further including the step of:
   (j) recording user data, such data selected from the group consisting of content seen, items purchased, user interface behaviors, and length of time the user spends interacting with or reading specific content.

22. A system for keying media that allows for the distribution of updateable content to an end user, said system comprising:
   an external media storage device;
   a keying application stored on said external media device;
   a unique source ID specific to said external media device;
   a network connected proprietary content server, said server including updated information content; and
   an end user network connected display device;
   wherein said keying application interacts with said proprietary content server for the network connected display device via the network connection, and said updated information content is provided to said end user network connected display device when the end user runs said keying application on said network-connected display device; and wherein if said external storage media containing said keying application is non-recordable, said keying application records the user ID on the local electronic device running said keying application.

23. The system of claim 22, wherein said content server loads said updated information content into said keying application and displays the most current content via said network connected display device.

24. The system of claim 22, wherein said external media storage device is selected from the group consisting of mini-CD, mini-DVD, full sized CD, full sized DVD, mini-disc, floppy disc, magnetic tape, memory card, and EEPROMS.

* * * * *